Figure 1:
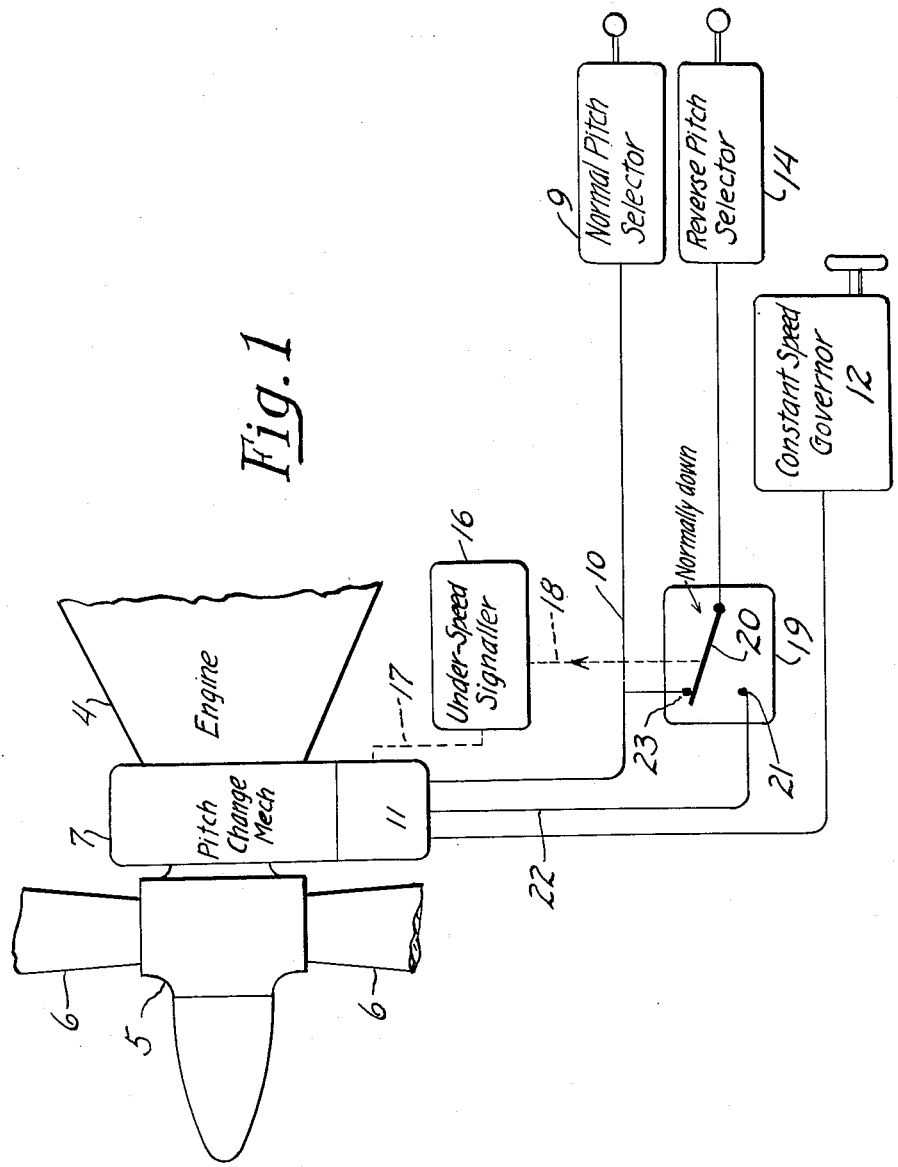

Jan. 17, 1956 E. K. HINE 2,731,094
PROPELLER UNREVERSING SYSTEM
Filed Nov. 27, 1951 2 Sheets-Sheet 1

INVENTOR.
EDWARD K. HINE
BY
Godfrey B. Speir
ATTORNEY

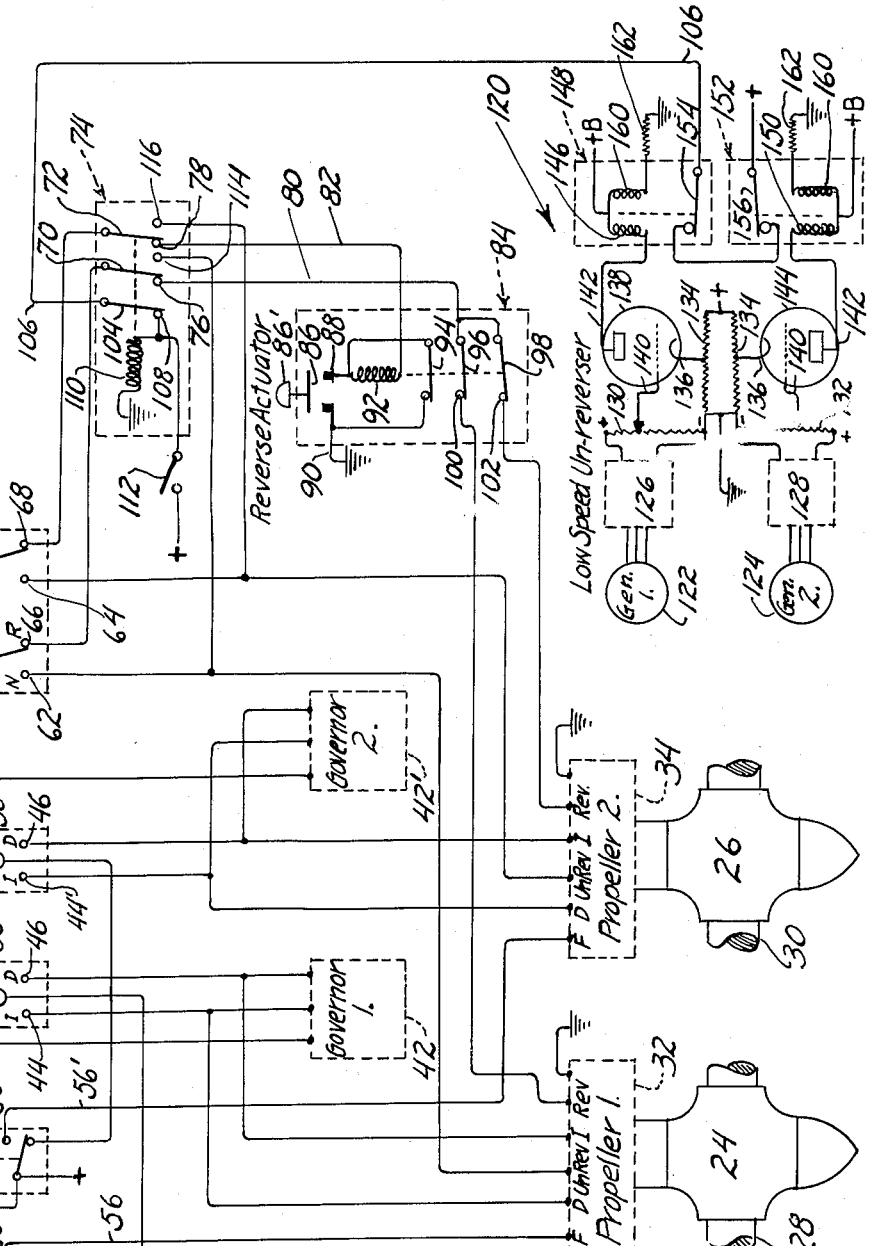

United States Patent Office 2,731,094
Patented Jan. 17, 1956

2,731,094

PROPELLER UNREVERSING SYSTEM

Edward K. Hine, North Caldwell, N. J., assignor to Curtiss-Wright Corporation, a corporation of Delaware Application November 27, 1951, Serial No. 258,446

12 Claims. (Cl. 170—135.29)

This invention relates to areonautical propellers and is concerned in particular with control systems therefore. Propellers are sometimes arranged so that the pitch of the blades may be reversed, while the propellers rotate in the same direction so that braking thrust may be developed when desired, either to slow the aircraft in the air, or to slow it during a landing run to shorten the normal landing distance. Where in-flight reversal is utilized, it must be applied while keeping the propeller rotating in a normal direction, to develop the negative thrust. If engine failure should occur during in-flight reversed propeller operation, the propellers will quickly slow down and will windmill in the opposite direction. Should this occur, control of both the engine and propeller is lost, and the results can easily be catastrophic. Even though this hazard exists, reverse pitch operation of propellers in flight, has advantages in aircraft operation which are very important. It enables rapid descent from high altitude and yields greater flexibility in aircraft operation than has been obtainable heretofore.

It is essential to prevent possible reversal of the direction of rotation of the propeller. It is an object of this invention to provide a system which will automatically shift the operating pitch range of a propeller from reverse pitch to positive pitch if there is a tendency of the propeller to under-speed during reverse pitch operation. If this automatic unreversal is accomplished the hazards above mentioned are obviated. If the propeller is in the forward pitch range, even though an engine failure exists, there is always the possibility of restoring the engine to normal operation or of feathering the propeller so that aircraft operation may be continued upon the remaining complement of engines and propellers. Even if the aircraft may have a small number of engines and propellers, conventional emergency landing techniques may be utilized in the case of engine failure in the air, without maximum hazard. If the propellers are permitted to rotate in the reverse direction, drag on the aircraft is increased and controllability is reduced so that accident hazard is high in the case where emergency landing procedures are required.

An in-flight reverse thrust procedure has recently been evolved for multi-engine aircraft, particularly for those aircraft with four or more engines and popellers. In practicing such techniques the propellers symmetrically paired on opposite sides of the aircraft plane of symmetry are reversed, so that reverse thrust is applied equally on the two sides of the plane of symmetry. Should the engine of one of two propellers so reversed fail, the reverse thrust from that propeller decreases markedly so that there is unequal braking effect on opposite sides of the airplane. This interferes with controllability and increases hazard. Thus, in case of an engine failure with reversed-thrust propellers it is not only desirable to un-reverse the propeller of the failed engine but also to un-reverse the corresponding propeller on the opposite side of the airplane. The present invention provides mechanisms by which symmetrical unreversing of propellers may be accomplished in case of under-speed of either one of the propellers comprising the reversed pair.

Further objects of the invention, and the particular provisions of the invention, will become apparent in reading the detailed description below when taken with the drawings, in which similar reference characters indicate similar parts and in which Fig. 1 is a diagram of the automatic unreversing system as applied to a single aircraft powerplant, and Fig. 2 is a diagram of the automatic unreversing system as applied to multiple-power plants.

Referring first to Fig. 1, I show an engine 4 driving a propeller 5, the latter comprising variable pitch blade 6 which may be changed in pitch by a pitch changing mechanism 7. The mechanism 7 may be of any desired type, well known in the art, which is controllable to vary the pitch of the propeller blades in the positive or normal pitch range and to vary the pitch of the blades into and from the reverse pitch range. Preferably, as is well known in the art, the rate of pitch change when making the transition between the forward and reverse pitch ranges should be very high so that the pitch transition may be accomplished with a minimum of propeller and engine over-speed. In the forward pitch range, it is conventional to control propeller pitch by means of a governor or synchronizer whereby the speed of the powerplant is controlled through blade pitch variation, whereby the load on the engine is altered. When the propeller is in the reverse pitch range, speed control may also be accomplished by reversing the sense of the governor device.

My invention is equally applicable to propeller systems which are equipped for governing in reverse pitch, or which are operated at a fixed reverse pitch angle.

In Fig. 1 I show diagrammatically a normal pitch selector control 9 which when effective, holds the propeller in the forward pitch range through an operating connection 10 to the control unit 11 of the mechanism 7. This permits propeller pitch control in the normal forward pitch range by a constant speed governor 12 or by alternative manual control. I also show a reverse pitch selector 14 which when operated causes the pitch changing control 11 and mechanism 7 to move the blades into the reverse pitch range, where the blades will stay until they are restored to the normal pitch range by operation of the selector 9.

I also provide a speed responsive device 16 driven from the propeller at 17 which will produce an appropriate signal when the propeller or engine may have dropped to a preestablished minimum speed level such as 1000 R. P. M. The device 16 is provided with an operating connection 18 to a switch 19 having an arm 20 connected to the selector 14. The arm 20 normally engages a point 21 connected at 22 to the reverse pitch change part of the control 11, and thence to the pitch change mechanism 7. When the arm is connected with the point 21 the reverse pitch selector 14 becomes operative in normal fashion to reverse propeller pitch, providing that the engine and propeller are operating at a normal speed level. Should the engine drop off to a low level as mentioned above the device 16 and connection 18 moves the arm 20 to a point on the switch 19 which will connect the selector 14 to the connection 10 and thus to the control unit 11 and pitch changing mechanism 7 to effect pitch change of the propeller from the reverse range to the forward range. This change will occur despite the fact that the reverse pitch selector 14 has been adjusted to hold the propeller in reverse pitch, and provides an automatic safety over-control for the reverse pitch range selector. If the powerplant is underspeed, both selectors 9 and 14 are connected through 10 to the pitch controller 11, so that inadvertent propeller pitch reversal is prevented.

If the propeller is operating in reverse pitch, underspeed of the engine will operate device 16 to move the propeller blades 6 into the forward pitch range, whereby further slowing down of the engine will not result in reverse wind-milling of the propeller.

Reference may now be made in Fig. 2 which shows the protective system of this invention in considerably greater detail.

Herein, I show propellers 24 and 26 respectively provided with blades 28 and 30 and the pitch changing mechanisms 32 and 34. Preferably, the propellers 24 and 26 are disposed symmetrically on opposite sides of airplane plane of symmetry. The pitch changing mechanisms 32 and 34 of the propellers are substantially the same and are provided with electrical connections as shown which when energized produce the functions of feathering, decreasing engine R. P. M., unreversing the propeller, increasing engine R. P. M. and reversing the propeller blade pitch. Propellers of the sort indicated are shown and described in detail in Chillson patent application, Serial No. 675,383 filed June 8, 1946, now U. S. Patent No. 2,640,552.

For normal control of the propeller 24, a selector switch 36 is provided whose central point 38 may be connected to point 40 for automatic governing of propeller speed. This point 40 is connected to a governor 42 which is in turn connected to the increase and decrease points on the pitch changing mechanism 32. Also, the point 38 of the switch 36 may be connected to points 44 and 46 for selectively increasing or decreasing propeller R. P. M. without governor control, these points respectively being connected to the corresponding points on the propeller mechanism 32.

Normal control provisions for the propeller 24 includes means for feathering, including a switch 48. When the two switch arms of this switch are down, the lower switch arm connects a power source with the point 38 of the switch 36, and the upper switch arm connects the power source with a point 50, which is connected to a point 52 of a pitch reversing switch 54. When the arms of the switch 48 are up, the upper arm connects to nothing and the lower arm connects the power source directly through a conductor 56 to the feathering terminal on the pitch change mechanism 32 of the propeller 24. If the feathering switch 48 is in the down position normal operation of the propeller is set up, the switch also setting up connections to enable reverse pitch propeller operation through the switch 54. When the feathering switch is pulled up, all other control connections except feathering are severed so that the feathering control takes priority over any other mode of propeller operation.

The normal control system for the propeller 26 is substantially identical with that just described for propeller 24, and similar reference characters, primed, are used for the switches, etc. associated with the propeller 26. An exception to this is connection of the point 50' of the switch 48' to a point 57 of the reverse selector switch 54.

The reverse switch 54 comprises a reverse arming switch for both propellers 24 and 26 and includes interlinked arms 58 and 60 connected to the points 52 and 57. When the arms 58 and 60 are engaged respectively with left hand switch points 62 and 64, circuits are established for operation of both propellers in the normal blade pitch range for propulsive thrust. The points 62 and 64 are connected as shown with the "unreverse" terminals on the propeller pitch change mechanisms 32 and 34, and when energized the blades will move to and will operate in forward pitch.

When the switch arms 58 and 60 are jointly moved to the right, power connections are made to points 66 and 68, which are connected to arms 70 and 72 respectively of switches in a relay 74. Under normal conditions these switch arms 70 and 72 are in the position shown and engage contacts 76 and 78 which are connected by conductors 80 and 82 respectively to a reverse actuator switch unit 84. The unit 84 comprises a manually operated plunger switch 86 which when plunged connects a point 88 to a ground point 90. This action energizes a solenoid 92 from the conductor 82 which then draws inter-linked switch arms 94, 96 and 98 upwardly. The switch arm 94 completes a circuit from the power lead 82 through the solenoid 92 to ground 90 thereby holding the solenoid in an energized condition even though the switch plunger 86' is released. The switch arms 96 and 98 are both connected to the power lead 80 and engage points 100 and 102 which are connected to the reversing terminals of the propeller pitch changing mechanisms 32 and 34 respectively. Therefore, power is furnished to reverse both propellers 24 and 26 simultaneously.

When the reversing switch 54 is restored to the normal position wherein the arms 58 and 60 engage the contacts 62 and 64, power connections are made to the unreversing terminals of the pitch change mechanisms so that unreversal of the propellers immediately occurs, to a pitch in the positive range. An unreverse limit switch in the mechanisms 32 and 34 terminates the unreversing action and turns propeller control over to the governors or to the selectors 36 and 36'.

If the reverse switch 54 was left in the reversing position and if feathering of the propellers were desired, operation of the switches 48 and 48' to feather would remove control from the reverse switch 54, and would establish feathering connections to the propellers to bring about immediate feathering from the reverse pitch range. If both propellers are in reverse pitch and the engine of one of them should fail with a resultant underspeeding of the propeller, both propellers will immediately be restored to the normal pitch range, as will become apparent. Then, if it is necessary to feather the propeller of the bailed powerplant, that one propeller may be feathered selectively by the switch 48 or 48' while the unfailed engine and propeller may continue to operate under normal conditions.

Reference should be made again to the relay unit 74. In this unit is a switch arm 104, normally energized through a conductor 106. The arm 104 engages a contact 108 connected to a solenoid 110 whose other end is grounded. The point 108 is also connected to a switch 112 which when closed connects the first end of the solenoid to a power source. When the solenoid 110 is energized either through closure of the switch 112 or is held energized by the switch 104, 108 being closed, the switch arms 104, 70 and 72 are held in the position shown. To set up circuits previously described to enable normal reverse and unreversing of the propeller, the switch 112 is utilized as a reset switch and may be closed transiently to energize the solenoid 110 after which the solenoid is held energized through the switch 104, 108. With the switch 112 normally open a cessation of the power supply from the conductor 106 de-energizes the solenoid 110, allowing the relay 74 to drop out and establishing contacts of the switch arms 70 and 72 respectively with contacts 114 and 116. These contacts are directly connected to the unreversing terminals on the pitch change mechanisms 32 and 34.

As will become apparent energization of conductor 106 depends upon both propellers operating at a rotational speed in excess of some predetermined speed. If either propeller drops below said pre-determined speed, the conductor 106 becomes de-energized whereupon connections are immediately established to unreverse both of the propellers 24 and 26. As pointed out in the introduction, the unreversal of both propellers is essential upon failure or under-speeding of either power plant in order to avoid asymmetry of reverse thrust upon the airplane. Even though the pilot might inadvertently select feathering of one propeller while both propellers were normally operating in reverse pitch, the other propeller would also be restored to the normal pitch range from the reverse range; upon speed reduction of the feathered propeller, the drop-off in rotational speed de-energizes the conductor 106 to cause automatic unreversal of the other propeller. Switch 112 should be closed during ground operation of the airplane for taxiing and for selective reversing and unreversing test. It is left open during normal flight operation.

The speed sensitive system which holds the conductor 106 energized during normal speed operation of both propellers and which de-energizes the conductor upon underspeed of either propeller is shown in the lower right hand corner of Fig. 2 at 120. Herein are two generators or alternators 122 and 124 respectively driven by the propellers 24 and 26 or by their driving engines. These generators or alternators are of the type wherein the output voltage is substantially proportional to the rotational speed of the unit. Assuming that the units 122 and 124 are multi-phase alternators, their outputs are respectively fed to multi-phase rectifiers 126 and 128. The direct current outputs of the rectifiers are connected across potentiometers 130 and 132 respectively. The negative end of the potentiometer 130 is connected to ground and also, through a cathode bias resistor 134 to a positive voltage supply. To a point on this resistor 134, a cathode 136 of an electronic tube 138 is connected to place an appropriate bias on the cathode. The grid 140 of the tube 138 is connected to an appropriate point on the potentiometer 130. The elements of the tube 138 are so adjusted voltage-wise that the tube will conduct when the voltage on the grid 140 is representative of an engine R. P. M. which is greater than the predetermined minimum. Should the R. P. M. of the related engine fall below the predetermined level, the positive voltage on the grid 140 will decrease to the point where the tube 138 cuts off and no longer conducts. Thus, the plate circuit 142 of the tube 138 will be energized or not depending on whether the related engine is at normal speed or is below a desired minimum.

The potentiometer 132 related to the other powerplant is connected into a circuit of another electronic tube 144. The circuit arrangements are similar to those previously described for tube 138 and thus are given the same reference characters.

The plate circuit of the tube 138 is connected to the solenoid 146 of a relay 148, the other end of the solenoid being connected to a source of plate power. The plate circuit of the tube 144 is connected to a solenoid 150 of a relay 152, the other end of the solenoid 150 being connected to a source of plate power. The solenoids 146 and 150 when energized respectively close switches 154 and 156 which are serially connected, one switch being connected to a power source and the other switch being connected to the conductor 106. When both propellers are operating at normal speed, both relays 148 and 152 will be energized and power will be provided to the conductor 106. If either propeller underspeeds, the relay 148 or the relay 152 will drop out, severing the power supply to the conductor 106 either through the switch 154 or through the switch 156, disabling the reverse pitch holding system and restoring both propellers to the normal pitch range as has been described previously.

Both relays 148 and 152 include solenoids 160 which are connected to the source of plate power and through resistor 162 to ground. These solenoids 160 buck the solenoids 146 and 150 tending to open switches 154 and 156. The effect of each bucking solenoid is overcome if the related one of the tubes 138 and 144 is conducting. These solenoids 160 provide compensation for voltage variation in the plate power source, rendering the relays 148 and 152 dependent upon the R. P. M. of the respective power plants and relatively independent of variations in the voltage of the plate power supply. Adjustment of the preset speed at which automatic unreversal of the propellers occurs is effected by adjustment of the grid voltage, through varying the points on the potentiometers 130 and 132.

The system disclosed is fail safe; any power, supply, component or tube failure in the unit 120 cuts off power to the conductor 106, preventing propeller reversal, or causing propeller unreversal if the propellers were already reversed.

The system shown in Fig. 2 represents a specific unreversing protecting system for powerplants and propellers which are presently of operational type. The principles disclosed, however, are adaptable to other types of propellers and various modifications of the system of Fig. 2 for such adaptations are deemed to lie within the scope of my invention. Also, the scope of the invention is deemed to comprehend modifications of the specific protective system disclosed, to include mechanical, hydraulic, pneumatic and other electrical arrangements which will secure the under-speed protection afforded by the specific arrangement disclosed. The scope of the invention is also considered to include the application of the principles of the invention to single power plants and to power plant combinations embodying numbers other than two.

Though several embodiments of the invention are shown it is to be understood that the invention may be applied in various forms and in various environments. Changes may be made in the arrangements shown without departing from the spirit of the invention. Reference should be had to the appended claims for definitions of the limits of the invention.

What is claimed is:

1. In a propeller and powerplant system comprising two powerplants each driving a variable pitch propeller, each propeller including a pitch changing mechanism, a control connected to both mechanisms movable to arm both mechanisms to reverse the blade pitch thereof and movable to operate both mechanisms to restore the blade pitch of the propellers to the forward pitch range, an actuating member operable only after arming movement of said control connected with said control and mechanisms to actuate said mechanisms to the reverse pitch range, and means connected to both power plants responsive to underspeed of either one of the power plants below a preestablished minimum connected to actuate said control and both said mechanisms to restore both of said propellers to the forward pitch range from the reverse pitch range.

2. In a powerplant system including two engines each driving a reversible controllable pitch propeller, control means connected to reverse the pitch of both propellers simultaneously from a forward pitch range, control means connected to unreverse the pitch of both propellers simultaneously from the reverse pitch range, and means connected to both propellers actuated by underspeed of either one of the propellers below a predetermined minimum, when the propellers are in the reverse pitch range, connected to operate said unreversing control means.

3. In a powerplant system including two engines each driving a reversible controllable pitch propeller, control means connected to reverse the pitch of both propellers simultaneously from a forward pitch range, control means connected to unreverse the pitch of both propellers simultaneously from the reverse pitch range, means connected to both propellers actuated by under-speed of either one of the propellers below a predetermined minimum, when the propellers are in the reverse pitch range, connected to operate said unreversing control means, and means selectively operable to prevent operation of said underspeed unreversing means.

4. In a powerplant system including two engines each driving a reversible pitch propeller, control means connected to reverse the pitch of both propellers simultaneously from a forward pitch range, control means connected to unreverse the pitch of both propellers simultaneously from the reverse pitch range, means connected to both propellers actuated by underspeed of either one of the propellers below a predetermined minimum, when the propellers are in the reverse pitch range, connected to operate said unreversing control means, and means to adjust the speed level at which said underspeed unreversing means becomes effective.

5. In a propulsion system including two independently driven reversible controllable pitch propellers, each propeller having its own pitch changing mechanism and constant speed control system, common control means connected to said mechanisms to operate both propellers simultaneously to the reverse pitch range, common unreversing control means connected to said mechanisms to operate both propellers simultaneously from the reverse to the forward pitch range, a propeller speed responsive device for and connected to each propeller, and means actuated by either said device and connected to both said devices and to said unreversing control means, in response to underspeed of either propeller below a predetermined minimum speed, to actuate said common unreversing control means.

6. In a propulsion system including two independently driven reversible controllable pitch propellers, each propeller having its own pitch changing mechanism and constant speed control system, common control means connected to said mechanisms to operate both propellers simultaneously to the reverse pitch range, common unreversing control means connected to said mechanisms to operate both propellers simultaneously from the reverse to the forward pitch range, a propeller speed responsive device for and connected to each propeller, means actuated by either said device and connected to both said devices and to said unreversing control means, in response to underspeed of either propeller below a predetermined minimum speed, to actuate said common unreversing control means, and means selectively operable to disable said device actuated means.

7. In a propulsion system including two independently driven reversible controllable pitch propellers, each propeller having its own pitch changing mechanism and constant speed control system, common control means connected to said mechanisms to operate both propellers simultaneously to the reverse pitch range, common unreversing control means connected to said mechanisms to operate both propellers simultaneously from the reverse to the forward pitch range, a propeller speed responsive device for and connected to each propeller, means actuated by either said device and connected to both said devices and to said unreversing control means, in response to underspeed of either propeller below a predetermined minimum speed, to actuate said common unreversing control means, said propeller speed responsive device comprising an underspeed responsive relay for each propeller, a switch in each relay, said switches being serially connected, and a circuit including said switches having therein a solenoid for operating said common unreversing control means.

8. In a control system for a reversible pitch propeller, a two-way switch movable to one position for normal pitch range and to another position for reverse pitch range, said switch comprising a part of circuits arranged to reverse and unreverse the propeller and providing a means by which reversal and unreversal of the propeller pitch is attained; a speed-sensitive device including a propeller driven generator whose voltage output is a function of speed, a relay connected to said generator and including a normally closed switch which opens as the voltage of said generator falls due to low propeller speed, a relay having switches in said circuits, said latter relay being operated upon opening of said normally closed switch, and the switches of said latter relay being connected in said circuits to unreverse the propeller in response to low propeller speed despite the call for reversed pitch by said two-way switch.

9. In a pair of reversible pitch propellers, a common control connected to actuate both propellers simultaneously into reverse pitch, a common control connected to actuate both said propellers simultaneously into forward pitch, and means connected to both propellers responsive to a substantial drop in speed of either one of said propellers connected to said controls to hold both said propellers in forward pitch or to move both said propellers from reverse to forward pitch.

10. In a propeller system including a hub having variable pitch blades mounted therein and a mechanism connected to change propeller blade pitch in the forward pitch range and to and from the reverse pitch range, manual control means connected to operate said mechanism for changing pitch to and from the reverse range, means actuated by the propeller, responsive to propeller speed, productive of an underspeed signal representing a speed less than a selected value, and over-control means connected to said responsive means and actuated by an underspeed signal therefrom, connected to said manual control means to cancel the reverse pitch setting of at least part thereof and to thereby cause operation of said mechanism to unreverse said propeller.

11. In a propeller system including a hub having variable pitch blades mounted therein and a mechanism connected to change propeller blade pitch in the forward pitch range and to and from the reverse pitch range, manual control means connected to operate said mechanism for changing pitch to and from the reverse range, means actuated by the propeller, responsive to propeller speed, productive of an underspeed signal representing a speed less than a selected value, over-control means connected to said responsive means and actuated by an underspeed signal therefrom, connected to said manual control means to cancel the reverse pitch setting of at least part thereof and to thereby cause operation of said mechanism to unreverse said propeller, said over-control means including arrangements to prevent further propeller reversal by said control means after return from reverse resulting from the occurrence of an underspeed signal.

12. In a reversible pitch propeller system, a control means to actuate said propeller into reverse pitch including a control element to actuate said propeller into forward pitch, means actuated by the propeller responsive to propeller speed productive of an underspeed signal representing speed less than a selected value, and means connected to said responsive means and actuated by an underspeed signal therefrom connected to over-control said control means when set for propeller pitch reversal to connect said propeller for forward pitch actuation.

References Cited in the file of this patent

UNITED STATES PATENTS

| | | |
|---|---|---|
| 2,412,605 | Drake | Dec. 17, 1946 |
| 2,593,910 | Morris | Apr. 22, 1952 |